3,266,973
METHOD OF PREPARING ADSORBENT FILTER PAPER CONTAINING CRYSTALLINE ZEOLITE PARTICLES, AND PAPER THEREOF
Richard P. Crowley, 64 Pillon Road, Milton, Mass.
No drawing. Filed July 25, 1963, Ser. No. 297,678
14 Claims. (Cl. 162—164)

My invention relates to fibrous articles having selective adsorbent characteristics. In particular, my invention concerns paper products capable of selectively capturing or separating very finely divided material from a fluid stream, the compositions employed, and the method of making and using these products. More particularly, my invention relates to an improved filter paper and its method of preparation.

It is therefore an object of my invention to provide fiber products and articles having a preselective adsorptive affinity for particular materials.

It is another object of my invention to provide an improved filter paper capable of removing particles, gases and the like of a particular size and dimension or chemical characteristics from a fluid stream.

A further object of my invention is to provide cellulosic products having a combination of ion exchange and selective adsorbent characteristics.

Another object of my invention is to provide a method of detecting gases and other materials in a fluid stream.

A further object of my invention is to provide an improved diazo reproduction paper and a method of improving development speed of exposed diazo reproduction paper.

Other objects and advantages of my invention will be apparent to those skilled in the art from the following detailed description of my invention.

I have found that fibrous products having selective adsorbent characteristics can be prepared by distributing throughout the body of a nonwoven fibrous material such as paper innumerable discrete finely divided particles of molecular sieves.

I have discovered that molecular sieve particles may be added to a solution of the fibers prior to sheet formation to provide a sheet characterized by the molecular sieve particles uniformly dispersed and retained throughout matted fibrous material. For example, I have found that cellulosic fibers such as paper pulp retain molecular sieve particles.

Finely divided molecular sieve particles are more easily incorporated in and distributed throughout the fibrous pulp material, are more efficiently retained, and provide a greater surface area and sieve pores for adsorption. The particles of molecular sieves should be small enough to pass through a U.S. Standard Sieve No. 100. Good results can be obtained with molecular sieve particles of between 0.1 to 100 microns such as 0.5 to 25 microns. The particular average particle size or range of the molecular sieves employed depends in part upon the ultimate utility of the product and the amount of adsorbent capacity desired.

In one embodiment the pulverized or finely divided sieve particles are added dry or as a concentrated slurry to a solution or slurry of the fibrous materials, for example containing from 1 to 6 weight percent of paper pulp, and are intimately dispersed before the fibrous stock is formed, molded, sheeted, extruded, calendered, or cast in final form. For example, the molecular sieve particles can be added to the aqueous paper making pulp slurry at the wet end of the machine and is known as "beater addition." Addition of the particles can be made to beaters, hydropulpers, jordans, fiberizing mills, as well as to the stuff box, head box, etc. or other pulp refining and preparation devices. The sieve particles should be thoroughly distributed throughout the pulp while the latter is suspended in an aqueous medium. In one embodiment of this invention, the particles are mixed with the pulp or paper-making stock in the beater, preferably at some stage before the pulp has been beaten to its ultimate degree of freeness; and beating is then continued while the particles are intimately distributed. One method is to add the sieve particles as a slurry in water. The particles should be distributed as uniformly as possible throughout the pulp; and for this purpose, conventional methods of stirring, mixing, beating or dispersing can be employed.

After the particles are dispersed or distributed substantially uniformly throughout the pulp or paper furnish or paper-making stock, the mass is laid down or molded or shaped by conventional means. While some of the particles may remain together with some of the fibers of pulp in the white water; the retention of the particles of resin in the formed pulp is high. The white water containing the particles may be recirculated and reused.

The quantity of sieve particles which is incorporated in the paper products of my invention can be varied widely depending on the size of the particles, the basis weight of the paper, the degree of the refinement of pulp, the nature of the sieve employed, and on the ultimate use of the product. It is, however, recommended that the paper products contain at least about five percent by weight of sieve particles based on the weight of the dry pulp so that the product has some or a significant selective capacity. While amounts of from five to 300 percent may be employed, a preferred range is from twenty-five to two hundred percent so that the adsorbing capacity be as high as possible with paper strength. In those cases where the paper products are required to be used a long time, as in the case of filters which cannot be easily regenerated high amounts can be used. High weight ratios of sieve particles to dry pulp make for weaker paper products, so that while the particular ratio which is employed is a matter of choice, it depends on the physical properties and the selective properties required in a particular application.

The paper furnishes to which the sieve particles are added may contain, in addition to the pulp, other modifying materials commonly in amounts from 0.1 to 10 weight percent, such as the conventional sizing agents, alum, natural and synthetic bonding agents and adhesives, loaders or fillers, like carbonate, oxides, clays, dispersible carbon black, etc. or dyes and pigments. Furthermore, other resins which are customarily used for imparting wet strength or bonding, such as the urea-aldehyde like phenol-formaldehyde, and melamine-aldehyde like melamine-aldehyde like melamine-formaldehyde resins, can be employed. Wetting agents or detergents such as amine, rosin and fatty acid soaps and salts, alkyl benzene sulphonates, amines and amides, etc., may also be employed to and in dispersing the sieve particles.

In another embodiment of my invention the molecular sieve particles can be employed in combination with particles of micropulverized water insoluble ion exchange resins to incorporate a combination of ion exchange and adsorbent properties into the fibrous material. For example, cation or anion exchange resins and mixtures thereof can be incorporated in the fibrous products along with the sieve particles in varying amounts depending upon the ion exchange properties required in the product, e.g. five to two hundred and fifty weight percent. In this manner the ion exchange resins such as in a paper product will be capable of entering into an ion exchange relationship with ions in liquid and gaseous streams, while the molecular sieve particles will be capable of exhibiting a selective adsorptive affinity for the same or different particles, gases, ions, etc. in the same fluid stream. This combination of properties may be quite desirable when the ions and molecules to be separated are of the same approximate molecular dimensions or chemical characteristics which would preclude separation or good separation by the sieve particles alone. The ion exchange resin can be selected to remove the one or more species of ions, while permitting one or more of a different species to be retained by the sieve particles. Selective removal such as by desorption or ion exchange from the particles will then permit these species to be separately recovered or detected. The incorporation of ion exchange particles in paper products is described more fully in U.S. Patent No. 2,955,067, issued October 4, 1960. Further, it is contemplated that dispersion of sieve particles with dispersible carbon black with or without ion exchange resins will also provide improved products of high adsorbency and having utility as cigarette filters, etc.

My invention will find great utility in the paper field wherein vegetable or animal cellulosic type fibers are employed such as in the case of cellulosic or proteinaceous fibers derived from wood, cotton, hemp, bagasse, bamboo, rags, grasses, straw, or other fiber sources and those fibers which fibrillate under mechanical beating or chemical action to promote the bonding forces between the overlapping, intertwining, and interlaced fibers. When these products are to be employed at elevated temperatures or under cellulosic fiber degrading conditions such as in damp areas or in contact with corrosive atmospheres, the cellulosic fibers may be replaced in whole or in part, e.g. 1 to 30 weight percent, with organic synthetic fibers or inorganic mineral fibers or mixtures thereof. As the amounts of mineral fibers or synthetic fibers increase, bonding adhesive additives will often be required to successfully retain these fibers and the sieve particles in proper sheet or molded formation. Therefore, these fibers are not employed in major amounts, but are commonly used to impart other desirable properties to the cellulosic fiber products. Mineral fibers include: asbestos fiber, vitreous fiber, such as solid and capillary glass and quartz fibers and spheres, metal, metal alloy, and metal oxide fibers and the like. Synthetic organic fibers would include polyesters like Dacron, polyamides like nylon, polyacrylates, polyesteramides, polynitriles, acrylonitriles, polyurethanes, polyvinyl acetate-chloride copolymers, cellulose esters like cellulose acetate, polyolefins like polyethylene and polypropylene, as well as natural and synthetic elastomeric materials or other filaments of synthetic resins.

The molecular sieve particles employed in my invention may be any finely divided solid water insoluble molecular sieve particles which have a preselective adsorptive affinity for substances of a particular type to the substantial exclusion of substances of another type. Inorganic crystalline molecular sieve particles of either the natural or synthetic variety can be employed to separate materials according to the diameter and configuration of the molecules. Sieve particles also can separate materials and molecules rather selectively by the difference in polarity of the molecule or the degree of unsaturation in the organic molecules. Further, the sieves have a high adsorption capacity at low adsorbate concentrations in the fluid stream. Sieves are characterized in general by a plurality of inner cavities having molecule-size pore entrances commonly ranging from about 3 to 15 Angstroms in diameter. The cavities of the sieve particles have a diameter about 2 to 5 times the diameter of the interstitial pore passageways giving about 45 to 51 volume percent in total void area to each total particle volume.

The preferred sieve particles for employment in my invention comprise: powdered natural or synthetic zeolites or alumino-silicates which are characterized by surface pores of molecular dimension and of relatively uniform size.

A suitable water insoluble molecular sieve is a calcium alumino-silicate, such as those having a pore size or diameter of about 5 Angstrom units, such as a pore size sufficient to admit straight chain hydrocarbons, such as the n-paraffins, to the substantial exclusion of the non-straight chain hydrocarbons, such as the naphthenic, aromatic and the isoparaffins and iso-olefinic hydrocarbons, e.g. isobutane and higher.

The sieve particles thus may include, but are not limited to: water insoluble sieves having cations of hydrogen, amonium, alkali, alkaline earth and metal alumino-silicates or combinations thereof such as sodium, potassium, calcium, magnesium, etc. and combinations thereof. Selection of the particular nature of the sieve particles to be employed is based on the utility of the fibrous product in which the sieve particle is to be incorporated. For example, a sheet of paper incorporating a 5 A. type sieve will permit the sieve to capture in the pores those molecules of approximately less molecular diameter than the pore size such as ammonia, carbon monoxide, carbon dioxide, hydrogen sulfide, while substantially excluding molecules of larger size, such as isopropane, benzene, ethane, etc. For example, a filter paper containing sieve particles, which paper comprises: a nonwoven fluid permeable sheet structure when placed in a gaseous stream of hyrogen sulfide and gaseous molecules of larger molecular dimensions, selectively adsorbs in the pores and sieve cavities the hydrogen sulfide, while permitting the passage through the sheet of the larger molecules.

My filter paper products permit the selective capture of predetermined size molecules from a fluid stream. The identification of these captured molecules can then be accomplished by conventional analytical test techniques. The selective capture of particular molecules is also effective in liquid streams such as the separation of straight chain paraffins from similar, but branch chain molecules or short chain aliphatic molecules from aromatic molecules, where the sieve incorporated in the nonwoven sheet is so selected.

The sieve particles may, if desired, contain catalytic materials such as finely divided elemental metals or metal salts coated or impregnated on the sieves. Suitable catalysts would include: rhodium, palladium, platinum, cobalt, nickel, molybdenum, silver, copper, transition metals and the like and their salts such as oxides, silicates, carbonates, etc. My products may be treated with or contain Friedel-Crafts, Ziegler, Natta or other catalyst compounds such as mixtures of aluminum alkyls and titanium halides, aluminum chloride, borotrifluoride, etc, to promote reactions such as polymerizations between the adsorbed molecules and the catalyst.

The paper pulp containing the dispersed sieve particles may be formed into thin sheets by conventional Fourdrinier or cylinder paper making machines, or molded or formed, after drainage of excess water, on any mandrel or any base material either to form a laminate structure with the base material by being bonded thereto or for shaping purposes.

After distribution of the sieve particles and the additives, if any, into the paper making slurry excess water is removed during the sheet forming step by permitting the water to drain through the supporting screen or by other means. The density and thickness of the sheet material will depend in part upon the ultimate use of the product. When the product is to be employed as a filtering media, the structure should permit the free passage of fluids, that is, be particularly porous and of low density. In general the products of my invention have the general appearance, porosity, and feel of the fibrous stock from which fabricated. Thus, paper products such as crepe, tissue, wrapping, blotting paper, towels, writing paper, cardboard, chipboard, boxboard, plates, boxes, cartons, and containers will normally have their conventional appearance and feel.

Upon removal of the excess water from the pulp slurry and the formation of the fibers and sieves into the desired shape, the product is generally further dried in the conventional manner such as either at elevated temperatures of 200 to 400° F. for short periods of time of 15 minutes to 6 hours, or for longer periods of time at lower temperatures.

The following examples illustrate the products, compositions, and methods of my invention.

*Example 1*

A 3 percent slurry of alpha cellulose cotton linters in water was prepared by dispersing the fibers in water with a high-speed, high shear agitation (Waring Blendor). The slurry was charged to a ball mill, using ½" pebbles as the grinding medium, and ground for two hours. A sample of the slurry containing about 2.0 grams of pulp (bone dry) was removed from the ball mill, poured into the high speed mixer, and diluted with three volumes of water. One and a half grams of type 5 A. Linde powder molecular sieves were slowly added to the pulp slurry with agitation. The sieves had a particle size of about 0.5 to 5 microns and a bulk density of 33 pounds per cubic foot. The mixture was poured into a 5" x 5" hand-sheet mold, formed into a sheet, and dried at 220° F. for 1½ hours. The resulting sheet contained the sieves uniformly retained and dispersed throughout the cellulose fibers. A material balance showed that more than 90 percent of the sieves had been retained in the fiber matrix. The product had the same appearance as an all-cellulosic filter paper, and there was no indication of separation of sieves from the fibers. Higher sieve concentrations are also possible. It may be desirable, depending upon the sieve concentration and the nature of the fiber matrix, to add materials which would increase the retention of sieves in the matrix without significantly decreasing the porosity of the finished product. The retention aid could be added either to the pulp slurry before the sieves are added, or it could be slurried with the sieves and the resulting mixture added to the pulp slurry. Suitable retention aids would include alum, sodium, carboxymethyl-cellulose, polyacrylamide, starch, urea-formaldehyde resin, or other materials which are commonly used in the paper industry for improving retention of fibers or pigments. Multivalent cationic materials, such as alum, which leave a net positive surface charge on the sieves, would be especially effective in promoting retention of the sieve on the negatively charged fiber.

*Example 2*

A paper having adsorbent and ion exchange properties is prepared by the method of Example 1, except that 1.0 gram of 5 A. of molecular sieve particles of about +325 mesh and 1.0 gram of weakly acidic or weakly basic cation or anion exchange resin particles having a similar mesh size are added to the pulp slurry.

*Example 3*

Example 2 is repeated except that 1.5 grams of a strongly basic anion exchange resin particle is incorporated into the pulp slurry with the sieve particles.

The ion exchange resins can include water insoluble copolymers of styrene and divinylbenzene, and copolymers of acrylic and methacrylic acid and alkyl esters thereof with divinylbenzene having quaternary ammonium or amino carboxylate or sulfonate functional groups. Since sieve particles are relatively stable in the pH range of 4 to 12, strongly acidic resins or slurries should be avoided.

*Example 4*

Example 1 is repeated except that 1.0 gram of finely divided water dispersible grade of carbon black is added with the sieve particles to prepare a sheet having the adsorbent characteristics of each class of particles.

*Example 5*

The paper prepared in Example 1 was exposed for about 1 second to the vapors above a 20 percent solution of ammonia in water at 20° C. There was no visible change in appearance of the paper. One drop of an ammonia indicator solution, consisting of a mixture of silver nitrate and manganous nitrate in water (Feigl, Spot Tests, Elsevier, 1960, page 97), was placed on the paper. The portion which had been exposed to the ammonia vapor immediately turned black, showing that ammonia had been adsorbed by the paper. Another sheet of paper prepared in the same way except that it did not contain sieves was also exposed to ammonia and treated with the indicator solution. There was no color reaction. This test showed that the ammonia was captured and adsorbed by the sieves and not by the fibers.

*Example 6*

In another test, the paper containing the sieve was saturated with the liquid indicator solution described in Example 5, and carefully dried. The paper was then exposed to the ammonia vapor for one second, with no visible change in the color of the paper. A drop of water was then placed on the paper, and the exposed area immediately turned black. Paper which did not contain the sieves gave no color reaction when treated in the same way.

The presence of numerous other gases can be readily detected in the same manner by simply changing the indicator solution to one which is specific for the gas being analyzed. The only requirement is that the gas be readily adsorbed on the sieves. Some gases and vapors which can be adsorbed and analyzed such as in air streams include: acetylenes, carbon dioxide, carbon monoxide, hydrazine, hydrogen sulfide, mercaptans, dimethyl sulfide, dimethyl sulfoxide, carbon disulfide, thiophene, methanol, ethanol, methane, nitrogen oxides, normal saturated aliphatic hydrocarbons, low-molecular weight normal unsaturated hydrocarbons, oxygen, water, and the like.

Rapid qualitative analysis of multiple-component gas mixtures can be obtained by passing the gas successively through papers containing specific indicators for each of the gaseous components and subsequently developing the color reactions by addition of water or other liquids or indicator solutions.

Also where the indicator or detecting solution is not readily prepared in dry undeveloped form on the fibers, such as where it is sensitive to moisture, the paper of Example 1, after exposure to the gaseous stream can be placed in the indicator or detecting solution where the color forming or detecting reaction can take place. In certain applications the detected material should be displaced from the pores of the sieve prior to use of the detecting method. By exposing the paper with sieves for predetermined time periods in the fluid stream to be analyzed and comparing the amount of the gas captured or the color developed by the indicator to a series of standards, a rough quantitative determination of the amount of the particular gas in the stream is possible.

In another embodiment of my invention fibrous sheets such as paper containing sieve particles can be used for a base sheet for diazo reproduction paper. My paper when saturated or impregnated with the conventional diazo aqueous or alcohol solution and dried, permits rapid development of the diazo dye when exposed to an ammonia vapor. For example, my paper can be saturated with an aqueous solution of a diazonium salt, a coupler agent like beta napthol, a weak acid or acid salt stabilizer like citric acid, brightening agents like metal oxides and carbonates, dyes, antioxidants, etc. and then dried. This paper when placed together with a transparent or translucent master and exposed to ultraviolet light reproduces a reversal latent image of the master on the sheet by the destruction of the ability of the diazonium salt to couple.

This is accomplished by the removal of nitrogen gas from the diazonium salt. Those areas not exposed or only partly exposed to the radiant energy are commonly developed by placing the sheet in a vapor stream of ammonia or in an alkaline solution. This permits a coupling reaction between the unexposed diazonium salt and the coupling agent to develop the desired azodye color. Exposure of the paper to ammonia must be for a sufficient time to permit complete development. My paper enhances the rapid development of the dye on exposure to the ammonia due to the selective affinity of the sieves for ammonia and perhaps the desorption of ammonia from the pores by the water vapor. Regardless of the method of functioning my paper often eliminates additional passes through the ammonia now required for complete development, or permits more rapid speeds in the development of paper in the conventional dry ammonia of the machine. My paper containing molecular sieves also finds utility in diazo and blueprint paper for promoting sharp contrast, reducing bleeding, and enhancing dye stability.

My invention therefore provides cellulosic products of selective adsorbent properties, which are useful in the capture removal, detection of material components of fluid stream. My paper will find utility in matted, sheet, fluted, tubular, accordian, cellular or other forms as analytical paper, filter paper for smoke such as cigarette filter paper for the removal of airborne bacteria, in the diazo reproduction field and in other areas.

What I claim is:

1. In the method of preparing paper stock characterized by an affinity for molecular materials which method includes: the steps of preparing an aqueous slurry of pulp; forming a sheet from the pulp; and drying the sheet, the improvement which comprises: adding to the pulp finely divided zeolite crystalline molecular sieve particles in an amount of from about 5 to 300 percent by weight based on the dry weight of the pulp.

2. A method as defined in claim 1 wherein the average diameter of the molecular sieve particles is between about 0.1 and 100 microns.

3. A method as defined in claim 1 wherein the molecular sieve comprises an alkaline earth alumina silicate.

4. A method as defined in claim 1 wherein the method includes additionally adding to the pulp finely divided water insoluble ion exchange resin particles in an amount of from about 5 to 250 percent by weight based on the dry weight of the pulp.

5. A method as defined in claim 1 wherein the method includes additionally adding to the pulp finely divided water dispersible water insoluble carbon black particles in an amount of from about 5 to 250 percent by weight based on the dry weight of the pulp.

6. A method as defined in claim 1 wherein the amount of sieve particles employed is between about 25 and 200 weight percent based on the dry weight of the pulp.

7. A method as defined in claim 1 wherein the method includes additionally adding to the formed paper sheet a detecting amount of a water soluble indicator composition which is capable of reacting with a gaseous molecular material for which the sieve particles have an affinity thereby indicating the presence of the material in a fluid stream to which the dried sheet is exposed.

8. A method for preparing a cellulosic paper sheet characterized by a preselective adsorptive affinity for molecular size materials which method includes: beating an aqueous slurry of cellulosic paper pulp; adding to the slurry zeolite crystalline molecular sieve particles in an amount from about 5 to 300 weight percent based on the dry weight of the pulp, said particles being of sufficient particle size to pass through a size 100 U.S. Standard Sieve; forming a sheet with the paper pulp slurry; and drying the sheet so formed.

9. A method as defined in claim 8 wherein the molecular sieve employed is a 5 A. molecular sieve.

10. A method as defined in claim 8 wherein the aqueous slurry contains from 1 to about 6 weight percent of paper pulp, the sheet formed is a relatively thin paper sheet being fluid permeable, and the sheet is dried at from 200 to 400° F.

11. A cellulosic paper product which includes a nonwoven matrix of dried cellulosic paper pulp containing dispersed therein from about 5 to 300 percent by weight based on the dry weight of the pulp of finely divided, zeolite crystalline molecular sieve particles.

12. A cellulosic paper product as defined in claim 11 wherein the matrix contains additionally from about 5 to 250 percent by weight based on the dry weight of the pulp of finely divided, water-insoluble ion exchange resin particles.

13. A cellulosic paper product as defined in claim 11 wherein the matrix contains additionally from about 5 to 250 percent by weight based on the weight of the dry pulp of finely divided, water-insoluble, water-dispersible carbon black particles.

14. A filter paper which includes a nonwoven dried matrix of cellulosic paper pulp in a relatively thin sheet which sheet is fluid permeable and contains uniformly dispersed throughout the matrix from about 5 to 300 weight percent based on the dried pulp of finely divided zeolite crystalline 5 A. molecular sieve particles, which particles are retained in the matrix by the pulp and impart a preselective affinity for gaseous molecules when the paper is exposed to a fluid stream.

References Cited by the Examiner

UNITED STATES PATENTS

| 2,727,820 | 12/1955 | Botkin et al. | 96—49 |
| 2,889,893 | 6/1959 | Hess et al. | 55—75 |
| 2,902,399 | 9/1959 | Paquin | 162—181 |
| 2,918,399 | 12/1959 | Eichmeier | 162—181 |
| 3,025,233 | 3/1962 | Figert | 210—502 |
| 3,076,707 | 2/1963 | Lawton et al. | 96—75 |
| 3,078,644 | 2/1963 | Milton | 55—75 |

OTHER REFERENCES

Helfferich: "Ion Exchange," McGraw-Hill Book Co. Inc., New York, 1962, pp. 12, 13 and 21 relied on.

DONALL H. SYLVESTER, *Primary Examiner.*

NORMAN G. TORCHIN, S. LEON BASHORE,
*Examiners.*

R. L. STONE, *Assistant Examiner.*